United States Patent [19]
Robinson et al.

[11] 3,952,892
[45] Apr. 27, 1976

[54] APPARATUS FOR HANDLING AND SPINNING TIRES AT A TRIMMING STATION

[75] Inventors: Jack Randall Robinson, Cuyahoga Falls; Roger T. Hilton, Akron, both of Ohio

[73] Assignee: The General Tire & Rubber Company, Akron, Ohio

[22] Filed: Mar. 27, 1975

[21] Appl. No.: 562,389

[52] U.S. Cl. .................................. 214/340; 157/13
[51] Int. Cl.[2] ............................................ B65G 7/04
[58] Field of Search ...................... 214/340; 157/13

[56] References Cited
UNITED STATES PATENTS
2,603,290  7/1952  Lindemann ............................ 157/13
2,996,110  8/1961  Bosomworth et al. ................ 157/13

Primary Examiner—Albert J. Makay

[57] ABSTRACT

Apparatus for sequentially loading and discharging from a trimming station, vulcanized vehicle tires of various sizes and for spinning a tire preferably while in an upright position to facilitate the removal therefrom of mold vents, flash, etc. The apparatus includes at least three parallel rollers adapted to engage the tire tread and circumpose the tire while spinning it about its axis of rotation. One of the rollers is driven, another applies suitable retaining pressure and one is retractable for discharging a trimmed tire. The spinning tire is held against axial movement by adjustable means adapted to accommodate tires of different widths. The diameter of the tire is automatically measured and the speed of rotation adjusted depending upon the diameter measurement.

9 Claims, 9 Drawing Figures

APPARATUS FOR HANDLING AND SPINNING TIRES AT A TRIMMING STATION

BACKGROUND OF THE INVENTION

This invention relates to the production of vehicle tires and especially to the processing of tires following their removal from a vulcanizing mold. More particularly, the invention relates to the procedure for removing or trimming from the tire, mold vents, mold flash and the like.

The invention has particular utility in connection with the post-cure processing of larger tires such as truck tires and tires for off-the-road equipment. After such tires are cured in a vulcanizing mold, it is necessary to trim or remove undesired protruberances from the tread and sidewall portions. Such protruberances include material that squeezes into small vents in the mold during the vulcanizing operation and material or flash that squeezes into spaces at the parting lines between mold sections.

According to existing practices, the tire to be trimmed is manually loaded in an apparatus that spins the tire about its axis of rotation while an operator, using one or more drag knives, cuts or trims away the undesired material from the spinning tire. The trimmed tire is then manually removed from the trimming station by the operator.

Truck tires, off the road tires, and the like are quite heavy and difficult to handle manually. Accordingly, the trimming operation for such tires is burdensome and time consuming. Also, manufacturing facilities for such tires are adapted to produce as many as several hundred different types of tires varying greatly in dimension, type of construction (e.g. bias or radial carcass construction) and/or tread design. Nevertheless, it is usually necessary to trim a manufacturing facility's entire production at one trimming station.

One difficulty often encountered with this arrangement is that the surface speed at which a relatively large tire is spun for the trimming operation may be effective for tires of one size but for tires of other sizes the drag knives may catch the tread rubber and be jerked out of the operator's hand. In view of this problem, the general rule is that slower surface speeds be used with tires of larger diameter. Measuring the tire diameter and adjusting the spin speed, however, is a complicated problem and generally not practical with most conventional equipment.

The apparatus of the present invention, however, resolves many of the difficulties indicated above and affords other features and advantages heretofore not obtainable.

SUMMARY OF THE INVENTION

It is among the objects of the invention to automatically load and unload tires in and from a spinning apparatus at a tire trimming station whereat the loaded vulcanized tire is spun about its axis to facilitate the trimming therefrom of undesired protruberances such as mold vents and flash.

Another object of the invention is to spin tires of widely varying construction and dimension about their respective axis of rotation to facilitate trimming therefrom of mold vents, mold flash and the like whereat the surface speed of the spinning tire is automatically adjusted according to the particular tire diameter.

Still another object of the invention is to eliminate the need for manually loading and unloading heavy tires (e.g. truck tires and the like) in and from a spinning apparatus at a trimming station.

A further object is to increase the number of relatively large tires of various sizes and shapes that can be trimmed of mold vents and flash by a single operator in a daily working shift.

These and other objects and advantages are accomplished by the unique apparatus of the invention which is adapted for location at a post-cure tire processing station whereat vulcanized tires of different dimension and construction are to be spun about their axis of rotation to facilitate the trimming therefrom of mold vents, flash and the like.

In accordance with the apparatus of the invention, at least three parallel rollers located as to circumpose the tire, are adapted to engage the tread portion of the tire at spaced circumferential locations and support the tire for spinning about its axis of rotation. Preferably, the tire is supported in an upright position with its axis of rotation generally horizontal. The rollers include a driver roller with variable speed drive means for spinning the tire, a movably mounted retaining roller adapted to apply retaining force to the tire and a retractable idler roller adapted to be shifted between a tire supporting position and a retracted position permitting the tire to be discharged from the trimming station. The apparatus includes adjustable means such as a pair of parallel axis rollers selectively engageable with opposite sides of the tire to be spun to assist in guiding the tire while spinning, and means for sensing and measuring the diameter of each tire to be loaded and for adjusting the speed of the drive means in accordance with the diameter measurement. Generally speaking, slower surface speeds are used with tires of larger diameter.

According to the preferred embodiment, the retractable roller is associated with a carriage movable in a horizontal plane and also supporting an inclined floor portion along which the tire rolls to its spinning position. When the retractable idler roller is removed by retraction of the carriage together with the floor portion, the tire drops out of its position where it is supported by the rollers and falls through a discharge chute.

According to another aspect of the invention the retaining roller is mounted on a pivot arm assembly and is biased by its own weight into force applying engagement with the tire. The pivot arm assembly is movable between a retracted position and an operating position depending upon the diameter of the tire to be spun. Once a trimmed tire is discharged from the trimming station the retaining roller is withdrawn such as by a fluid cylinder to a position preparatory to the loading of another tire to be trimmed. After the tire is rolled into position resting on at least two rollers below, the retaining roller is pivoted into force applying engagement with the tire.

DESCRIPTION OF THE PREFERRED EMBODIMENT

Figure 1:
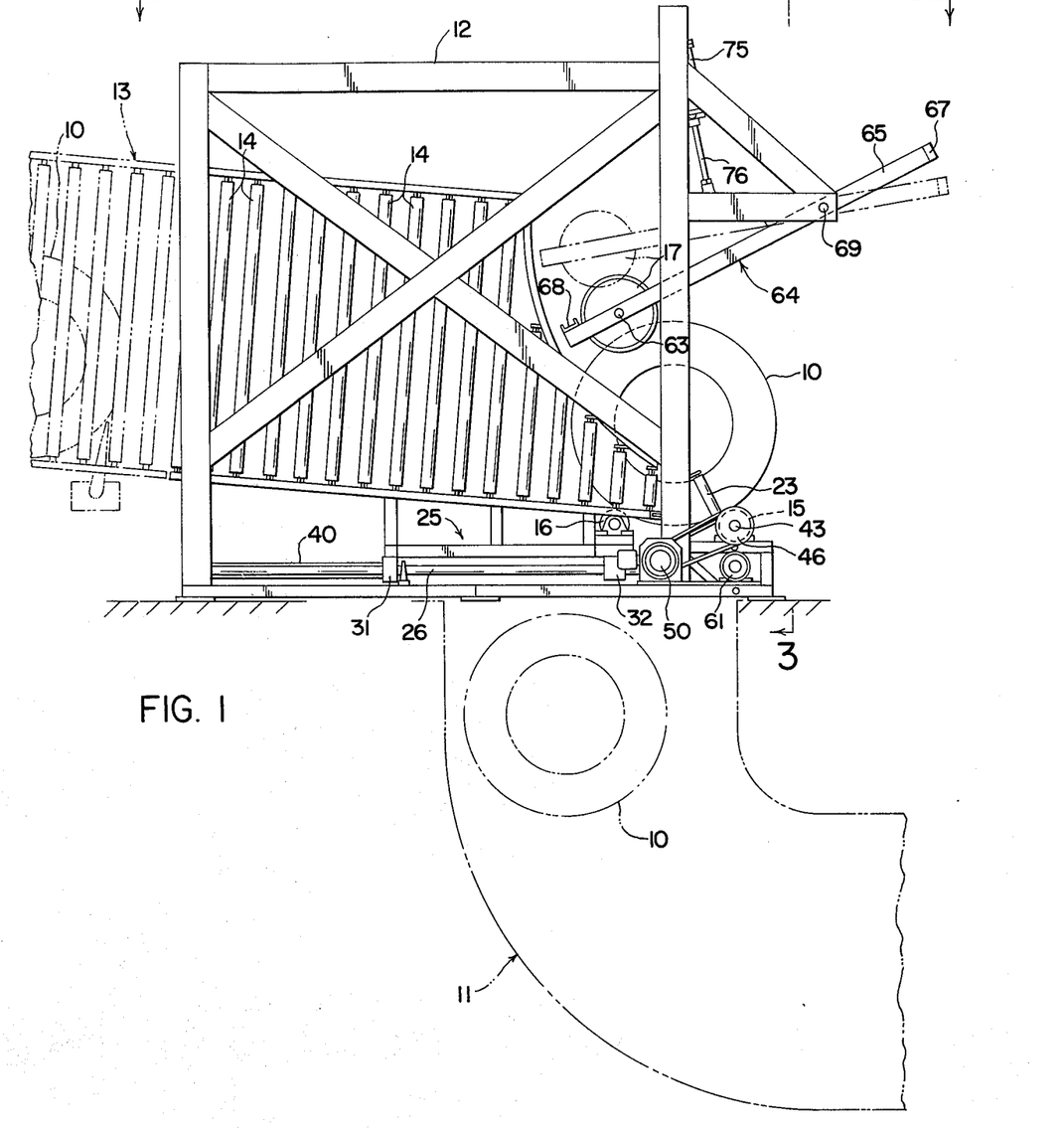
FIG. 1 is a side elevation illustrating an apparatus for automatically loading and unloading vehicle tires at a trimming station and for spinning a loaded tire about its axis of rotation, in accordance with the present invention.
Figure 2:
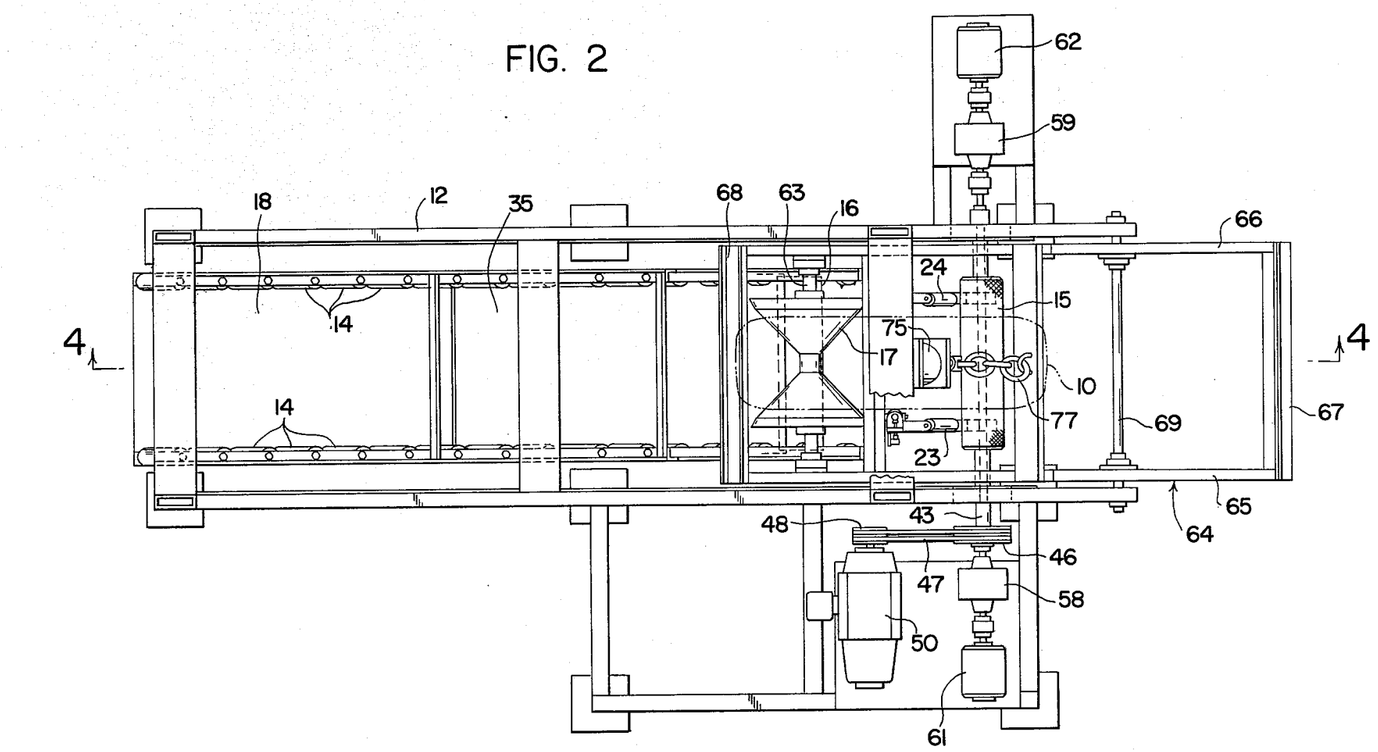
FIG. 2 is a plan view of the apparatus taken from the line 2—2 of FIG. 1.
Figure 3:
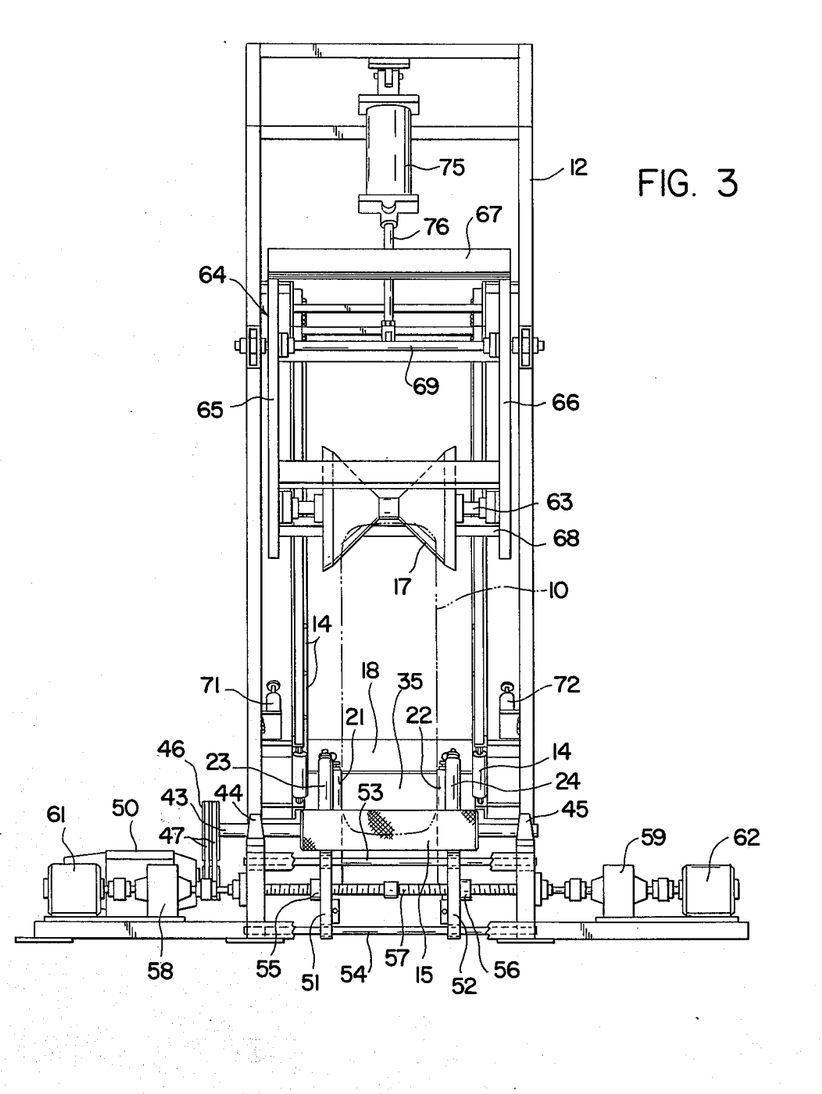
FIG. 3 is an end elevation of the apparatus taken from the line 3—3 of FIG. 1, with parts broken away for the purpose of illustration.

Referring more particularly to the drawings, and initially to FIGS. 1, 2 and 3, there is shown an apparatus A embodying the invention for sequentially receiving and locating a tire 101 at a trimming station in a generally upright position, and spinning the tire about its axis of rotation whereupon an operator trims away undesirable protruberances such as mold vents and flash using conventional drag knives or the like. The trimmed tire is automatically removed on the operator's command to a discharge chute 11 shown in phantom lines, the chute 11 being located below the trimming station so that the tire 10 drops downward and then passes beneath the operator.

The apparatus is located at a convenient working space in an elevated position, spaced, for example, seven or eight feet above the floor. The apparatus has a frame 12 formed of structural metal numbers including uprights, cross members and diagonal bracing. Tires are supplied to the apparatus in an upright position along a loading conveyor 13 shown in phantom lines in FIG. 1 and pass on to the appratus A whereupon they roll along an inclined floor 18 between a plurality of upright guide rollers 14.

The tire 10 comes to rest at the trimming station where it is supported by a drive roller 15, and a retractable idler roller 16. An overhead retaining roller 17 of heavy construction swings down onto the top of the tire 10 and applies retaining force through its own weight. The roller 17 is supported to swing into and out of engagement with the tire 10 so that it may be withdrawn from operating position during loading and unloading. The mounting arrangement and operation of the retaining roller 17 will be described in greater detail below.

In the loaded condition the tire 10 is securely held and circumposed by the three parallel rollers 15, 16 and 17 so that it may be spun in a fixed position about its own axis of rotation.

Prior to the operation of the drive roller 15 a pair of opposed parallel pressure rollers 21 and 22 adapted for movement toward and away from one another are moved toward one another until they engage the siewalls of the tire and retain it against axial movement during the spinning operation. The initial positioning of the tire is assisted by a pair of parallel locating rollers 23 and 24 that move with the rollers 21 and 22 respectively to prevent the tire from canting out of its proper vertical plane. The construction and operation of the guide rollers will be described in more detail below.

Figure 4:
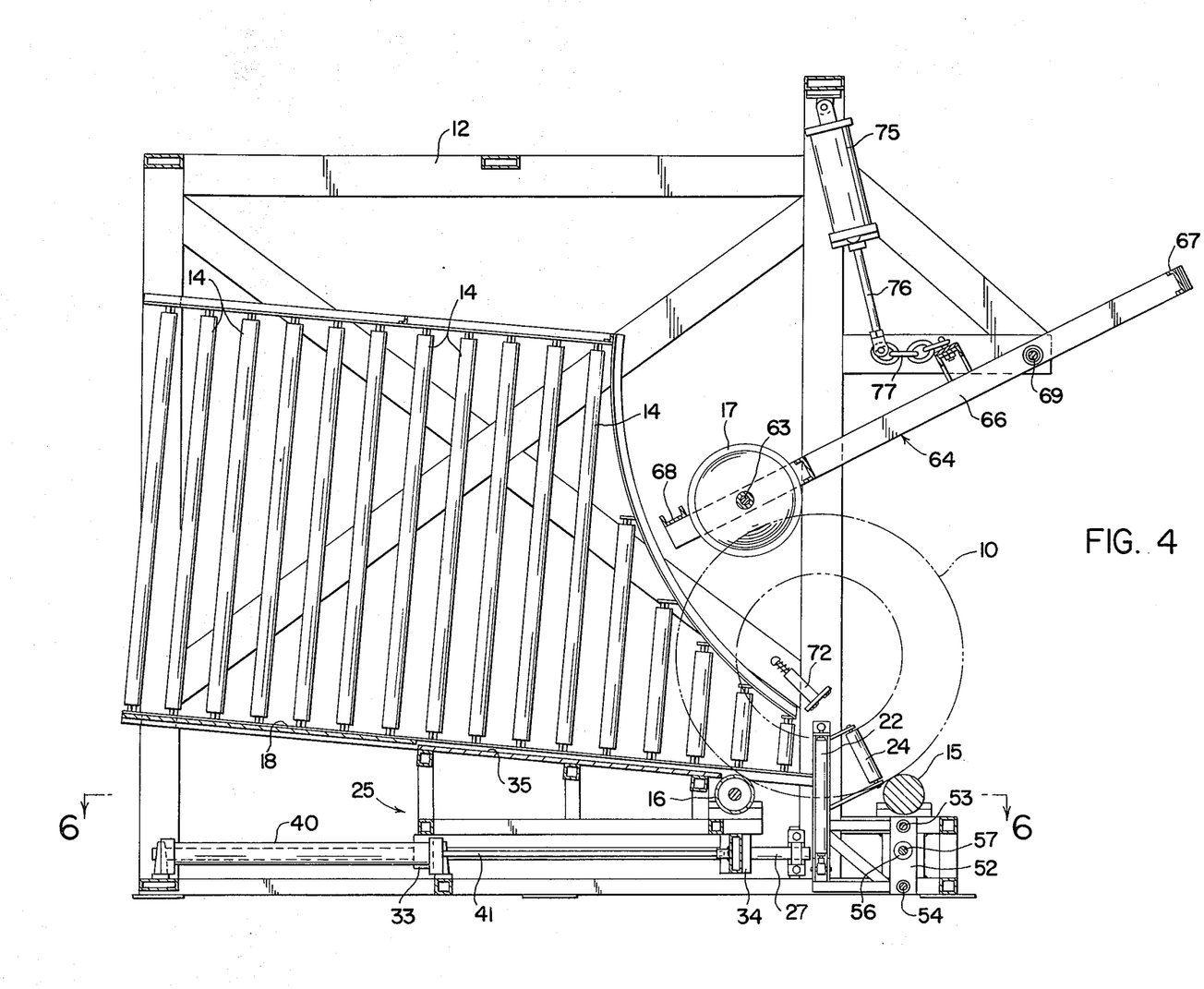
FIG. 4 is a fragmentary sectional view on an enlarged scale taken on the line 4—4 of FIG. 2.
Figure 5:
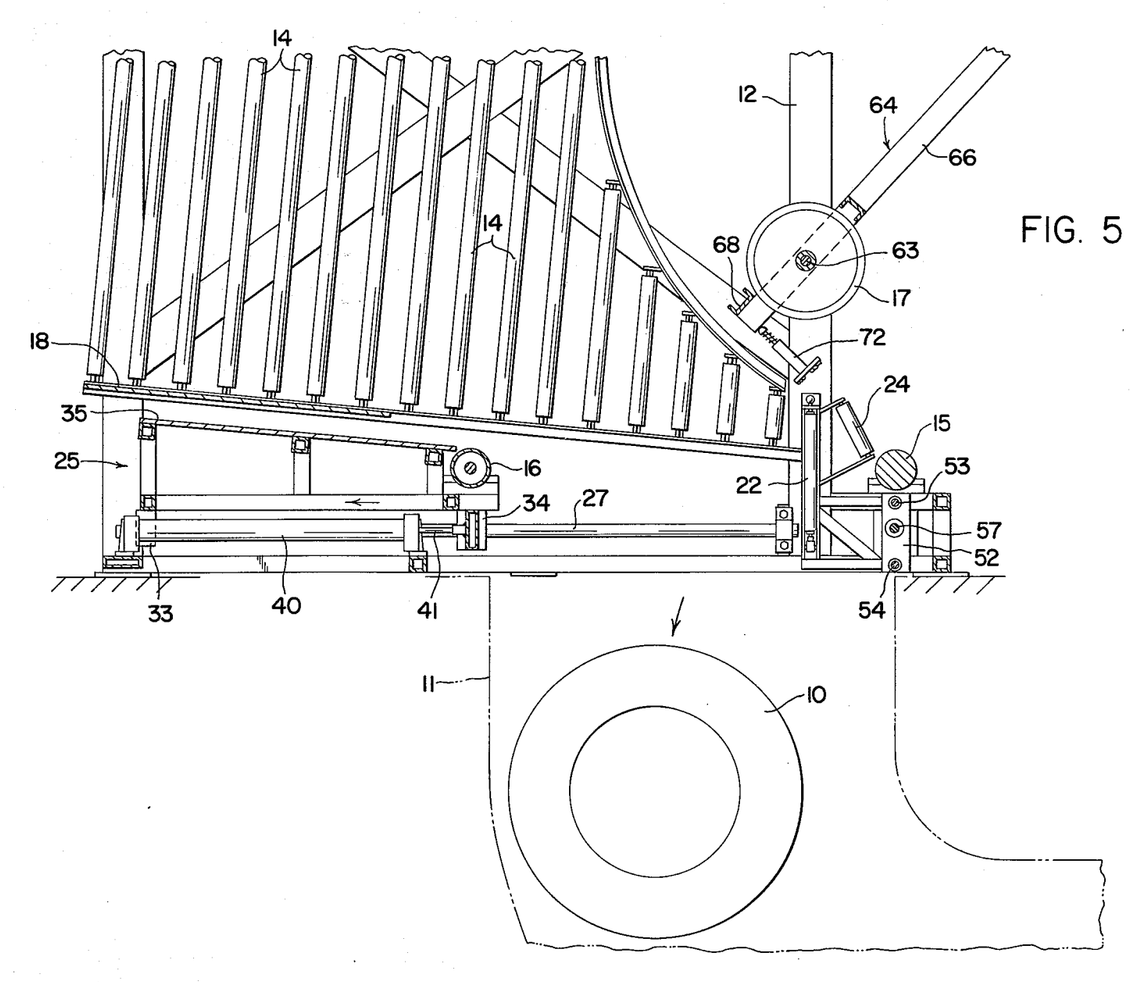
FIG. 5 is a fragmentary sectional view similar to and on the same scale as FIG. 4, illustrating the condition of the apparatus during the discharge of a trimmed tire from the trimming station into a discharge chute shown in phantom lines.
Figure 6:
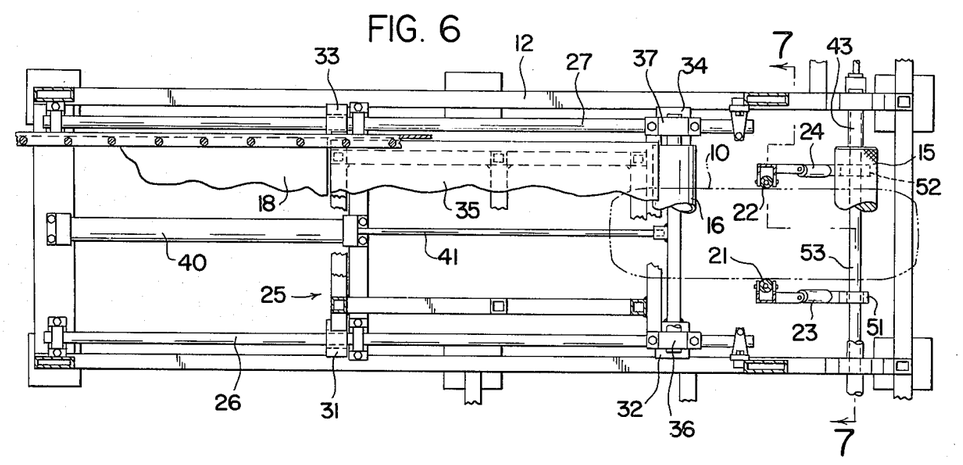
FIG. 6 is a fragmentary sectional view with parts broken away taken on the line 6—6 of FIG. 4.

The retractable idler roller 16 is associated with an unloading assembly including a carriage 25 movable in a horizontal direction between an extended position illustrated in FIGS. 1 and 4 and a retracted position illustrated in FIG. 5. The carriage 25 travels on a pair of spaced parallel guide shafts 26 and 27 mounted on the frame 12. Bronze bushings 31, 32, 33 and 34 mounted at each corner of the carriage 25 slide along the shafts 26 and 27. The carriage 25 supports a retractable floor portion 35 which forms a forward extension of the inclined floor 18 but which is adapted when retracted to move under the rearward portion of the inclined floor 18. At the forward end of the retractable floor portion 35 the retractable idler roller 16 is journaled in a pair of pillow blocks 36 and 37.

The carriage 25 is moved between its extended and retracted position by means of an air cylinder 40 with a rod 41 connected to the carriage 25 and with its rearward end connected to the frame 12. Accordingly, the carriage 25 is movable between an extended position best illustrated in FIGS. 1 and 4 wherein the idler roller 16 is closely spaced relative to the drive roller 15 and wherein the floor portion 35 forms an extension of the inclined floor 18 so that the tire 10 rolls to its position at the trimming station.

When the carriage 25 is retracted by the cylinder 40 to the position illustrated in FIG. 5, the idler roller 16 is sufficiently spaced from the drive roller 15 that the trimmed tire 10 falls through to the discharge chute 11 below. After a trimmed tire is discharged the carriage 25 is immediately returned to the extended position preparatory to the loading of another tire.

The drive roller 15 has a shaft 43 that is journaled in pillow blocks 44 and 45 bolted to the frame, the shaft 43 having a pulley 46 at one end driven by a pair of belts 47 from a drive pulley 48 mounted on the output shaft of a variable speed drive motor 50. The speed of the motor 50 is adjusted depending upon the diameter of the tire so that slower surface speeds are provided for tires of a larger diameter.

The sidewall engaging pressure rollers 21 and 22 and their associated guide rollers 23 and 24 as indicated above are movable toward and away from one another between trimming operations. The rollers 21, 23 and 22, 24 are mounted on carriages 51 and 52 respectively that slide laterally on horizontal guide rods 53 and 54. The upper ends of the shafts of the rollers 21 and 22 are loosely journaled in slots and are urged by springs toward the tire sidewall. When the rollers 21 and 22 initially engage the tire sidewalls, the springs are compressed and the shafts actuate limit switches that halt further inward movement of the rollers against the tire sidewall. The guide rollers 23 and 24 do not engage the tire sidewall during the spinning operation but merely serve to engage and guide the tire during the initial positioning prior to spinning. The carriages 51 and 52 are moved simultaneously toward and away from one another by means of ball nuts 55 and 56 mounted thereon and which are operatively associated with a ball screw 57 with threads of opposite pitch on either side of its center. The ball screw 57 extends horizontally through both of the ball nuts 55 and 56 and the operation thereof is controlled as illustrated in FIGS. 2 and 3 by solenoid operated clutch and brake units 58 and 59 operatively associated with drive motors 61 and 62 one of which is located at each end of the ball screw 57. The motors 61 and 62 are adapted to turn the ball screw 57 in opposite directions and the direction depends on which clutch is engaged. When neither of the clutches is engaged, one of the brakes is engaged to positively fix the position of the carriages 51 and 52.

The overhead retaining roller 17 has a generally conical form and a shaft 63 journaled in a lever arm assembly 64 including a pair of spaced parallel cooperating lever arms 65 and 66 rigidly connected together by cross bracing 67 and 68. The lever arms 65 and 66 are pivoted on a horizontal shaft 69 mounted on the frame 12, between an upwardly swung position preparatory to loading of a tire and as illustrated in dashed lines in FIG. 1, and an operating position illustrated in solid lines in FIGS. 1, 3 and 4. The weight of the roller 17 serves to retain the tire 10 in position for spinning circumposed by the three rollers 15, 16 and 17. Also the weight thereof assists in the discharging of the tire once the carriage 25 is retracted.

As the tire 10 is discharged the lever arms 65 and 66 drop and engage a pair of shock absorbers 71 and 72, after which a limit switch operated by retraction of the carriages 25 actuates a lever retraction cylinder 75 with a rod 76. The lever arm assembly 64 is operatively connected to the rod 76 by means of a short chain length 77 which is used to retract the roller 17. When the roll 17 is in its operating position, however, no pressure can be applied by the retraction cylinder 75. Only the weight of the roller 17 is used to apply retaining force to the tire. The retraction of the roller 17 following a trimming operation permits loading of a new tire 10 after which the cylinder 75 extends to permit the roller 17 to drop into operating position.

CONTROL SYSTEM

As indicated above the tire loading and discharging operations of the apparatus A are performed semi-automatically and the surface speed of the spinning tire is controlled depending upon the diameter of the tire to be trimmed. The surface speed is of course derived from the speed of the drive motor 50 which is a 3 hp. variable speed DC motor. The diameter of the tire is sensed and measured by means of four photo cells 81, 82, 83 and 84 mounted on the frame 12 in vertical alignment whereupon the respective beams are interrupted progressively from bottom to top depending upon the diameter of the tire. The larger the diameter of the tire the greater the number of photo cell beams that will be interrupted. The photo cells 81, 82, 83 and 84 thus provide for four diameter ranges which determine the speed selection. In the present instance four speeds are provided.

Figure 9:
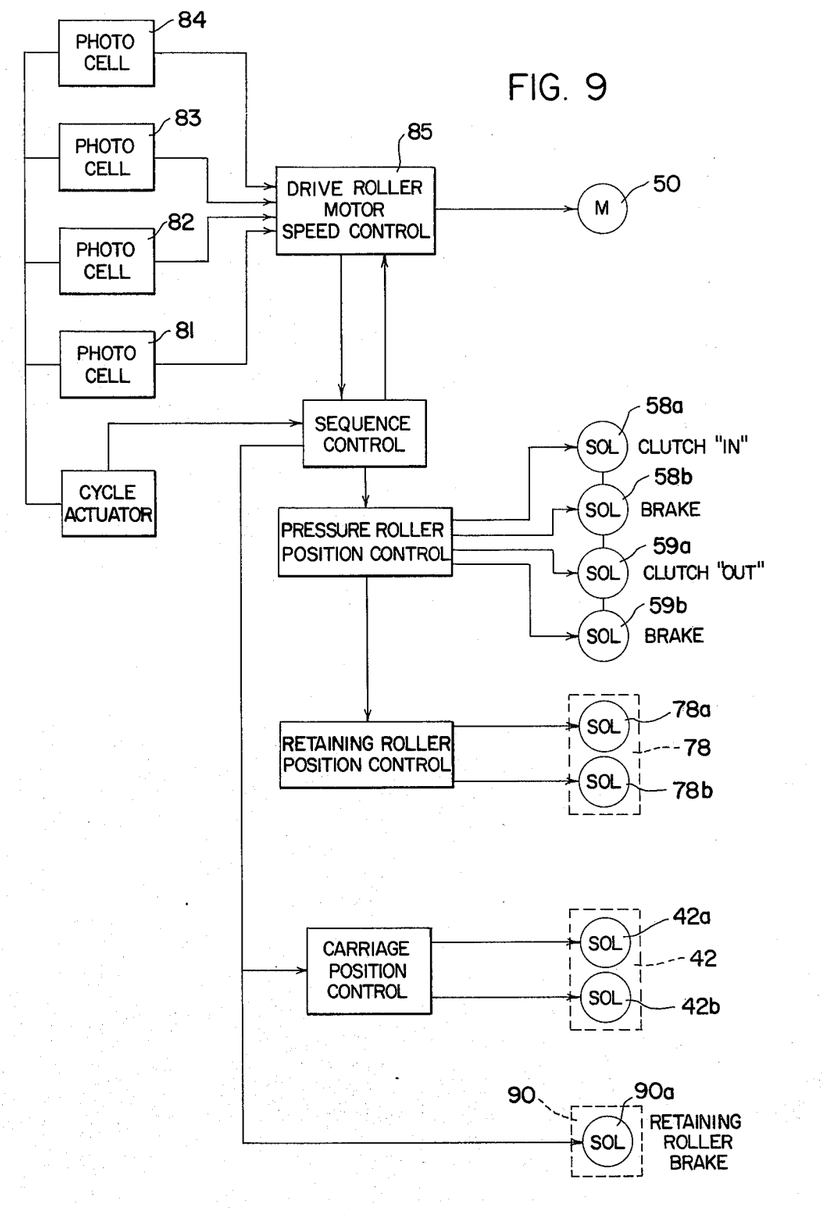
FIG. 9 is a schematic diagram, partly in block form illustrating the electrical control system for the apparatus of FIGS. 1 through 7.

The signals from the photo cell units 81, 82, 83 and 84 are supplied to a drive roller motor speed control unit 85 (FIG. 9). The speed control unit 85 is energized continuously, however, the motor 50 is not driven at operating speed until the tire is in its trimming position with the retainer roller 17 lowered into engagement with the tire tread. The carriages 51 and 52 are moved inwardly as soon as the tire is in its trimming position, to bring the pressure rollers 21 and 22 into engagement with the sidewalls of the tire. The inward movement results from the engagement of a clutch solenoid 58a of the clutch brake unit 58. As soon as the clutch 58a is engaged the brake solenoid 58b is deenergized. With the clutch 58a energized the motor 61 turns the ball screw in a direction causing the ball nuts 55 and 56 to move inward. As the pressure rollers 21 and 22 engage the sidewall of the tire the upper ends of the shafts thereof are pushed outward to depress the springs and actuate limit switches 91 and 92 which when both are actuated cause deenergizing of the solenoid 58a and energizing of the brake solenoid 58b to lock the ball screw in the inward position. As the tire 10 is driven at the desired surface speed the operator using drag knives (normally one in each hand) trims mold flash and vents from the spinning tire as necessary.

Figure 8:
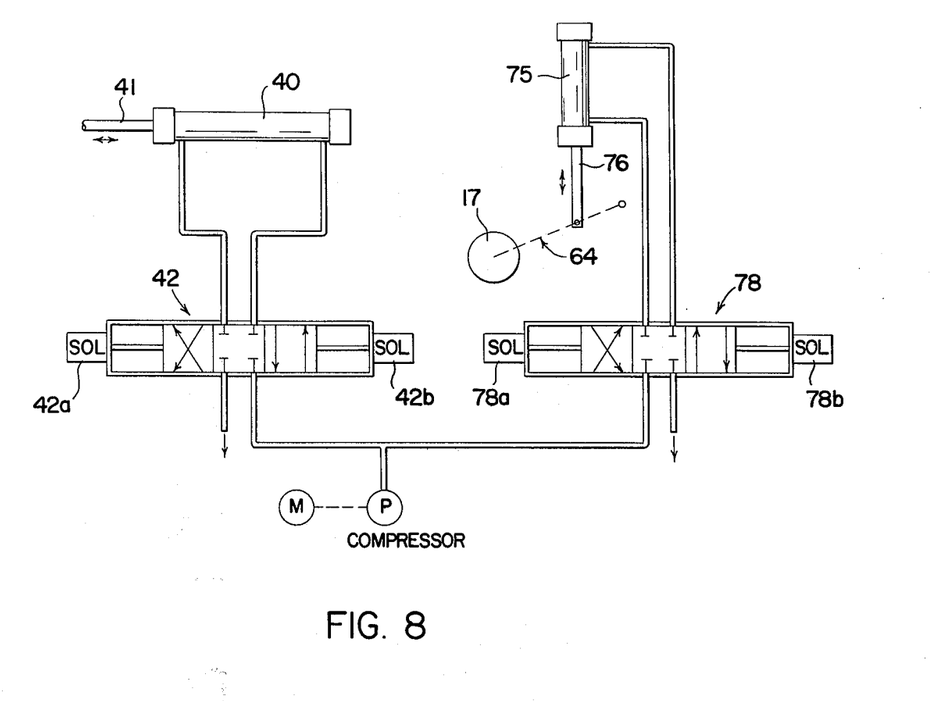
FIG. 8 is a schematic diagram illustrating the fluid pressure operating system for the apparatus of the invention.

Once the tire operation has been completed the operator depresses a foot switch to activate the two discharge functions. The brake solenoid 58b is deenergized and the clutch solenoid for the unit 59 is energized to drive the ball screw 57 through the motor 62 and cause opening of the carriages 51 and 52. The solenoid 42b is energized to move the solenoid valve 42 to a position (FIG. 8) causing the cylinder 40 to retract the carriage 25. Accordingly, the tire 10 falls through the resulting space to the discharge chute 11 below (FIG. 5). The retaining roller 17 swings downward to help discharge the tire 10, until the lever arm assembly strikes the shock absorbers 71 and 72. The carriage 25 when retracted operates a limit switch to energize solenoid 78b of valve 78 to cause retraction movement of the air cylinder 75. This lifts the lever assembly 64 to the raised position. Also, a pneumatic brake unit 90 operated by solenoid 90a (FIG. 9) stops the spinning roller 17.

As soon as the carriage 25 reaches its retracted position the limit switch it operates energizes solenoid 42a and deenergizes solenoid 42b to cause its immediate extension back to the operating position preparatory to loading of another tire.

OPERATION

The operation of the apparatus A may best be described with reference to FIGS. 4 and 5 and to the diagram of FIG. 9. For the purpose of this description it will be assumed that the cylinder 75 has lifted the lever assembly 64 to the raised position with the retainer roller 17 at a sufficient height to permit the tire to roll into trimming position. Both motors 61 and 62 are energized and operating and both clutch solenoids 58a and 59a are deenergized and the pressure rollers 21 and 22 are at their widely spaced, outward position. The fluid cylinder 40 has its rod 41 extended to move the carriage 25 to the position shown in FIG. 4. Also the drive motor 50 is turning at a relatively slow speed so as to drive roller 15 at a speed of approximately 400 feet per minute.

With the apparatus A in this condition a tire is released by a suitable mechanism associated with the loading conveyor 13 and a tire 10 to be trimmed rolls along the floor 18 and the floor portion 35 between the upright guide rolls 14 until it reaches the position illustrated in FIG. 4 whereat it rests upon the slowly turning drive roller 15 and the retractable idler roller 16. The relatively slow rotation of the drive roller 15 is necessary in order to stabilize the tire before its spinning speed is increased to the relatively high predetermined operating speed. During the movement of the tire along the floor 18 it passes a vertical alignment of the four photo cells 81, 82, 83 and 84, and one or more of the photo cell beams was interrupted by the tire 10 depending upon its diameter. Accordingly, the photo cells 81, 82, 83 and 84 have served to measure and classify the diameter of the tire between four dimensional categories. The resulting measurement has been transmitted to the drive roller motor speed control unit 85 which is then set to a certain speed condition for the particular tire 10.

As the tire 10 rolls along the floor 35 it interrupts a photo cell beam which through timers energizes the solenoid 78a of the valve 78 to operate the cylinder 75 and cause extension of the cylinder rod 76. This permits the roller 17 to contact the tire just as the tire comes in contact with drive roller 15.

Also, the timers energize the clutch solenoid 58a to connect the motor 61 to the ball screw 57 to turn the ball screw 57 in a direction that causes the carriages 51 and 52 to move toward one another. The tire initially may be canted in such a way that one of the guide rolls 23 and 24 will initially engage and guide it into a position whereat its axis of rotation is parallel to the axis of rotation of the rollers 15, 16 and 17.

Figure 7:
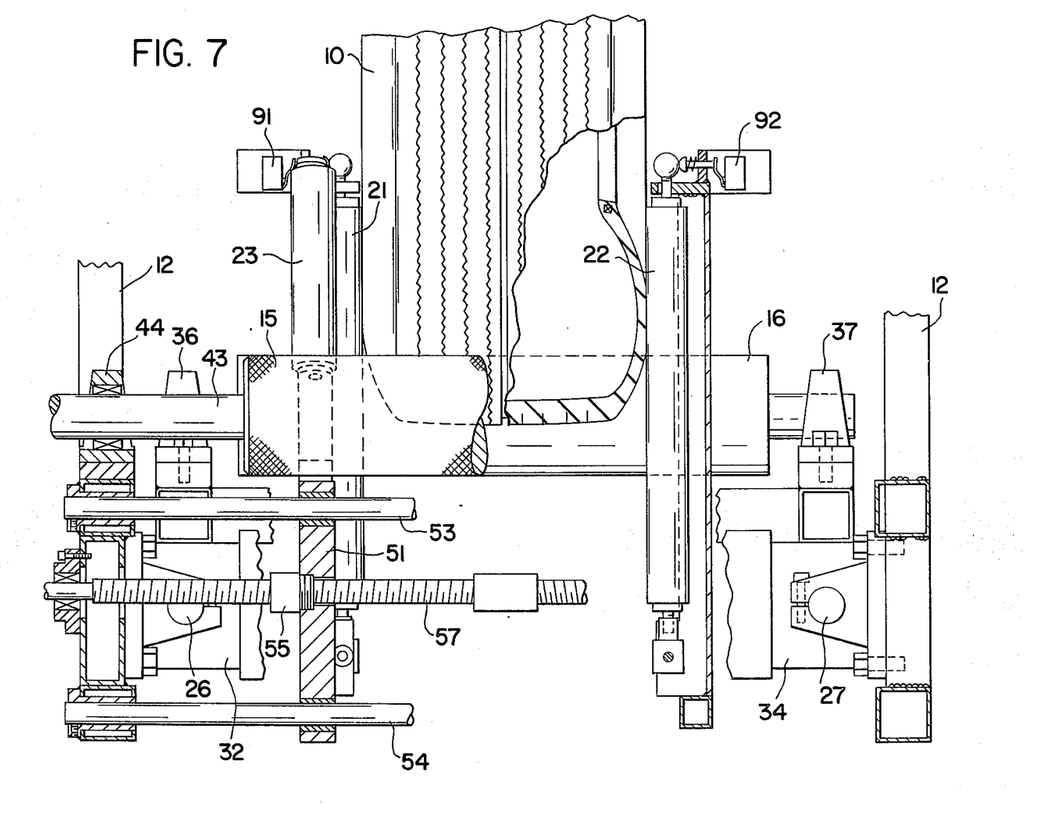
FIG. 7 is a fragmentary sectional view on an enlarged scale with parts broken away, taken on the line 7—7 of FIG. 6.

As the pressure rollers 21 and 22 reach pressure applying position the upper ends of their respective shafts which are loosely mounted in a slot in the respective carriages 51 and 52 will be pushed slightly backward and actuate limit switch units 91 and 92 (FIG. 7) which, when both are actuated, deenergize the clutch solenoid 58a and energize brake solenoid 58b so that the carriages 51 and 52 will be retained at the desired spacing during the spinning operation.

At this time, the operator depresses a foot switch which speeds up drive roller motor 50 to the higher predetermined surface speed. The operator then applies drag knives or the like to the sidewall surfaces of the spinning tire to remove mold vents, flash, etc.

After the trimming has been accomplished the operator activates a foot switch that activates several functions. As one function, the brake solenoid 58b is deenergized and the clutch solenoid 59a is energized to drive the ball screw 57 in the reverse direction with the motor 62 to cause the pressure rolls 21 and 22 to withdraw from the sidewall of the tire. Also, the solenoid 42b of the valve 42 that controls the fluid cylinder is energized to cause retraction of the cylinder rod 41 and thus withdrawal of the carriage 25 and idler roll 16. Accordingly, the trimmed tire drops into the discharge chute 11 as illustrated in FIG. 5. The discharge is assisted by the force of the retainer roller 17 which is free to swing downward as the tire drops. The downward swing of the lever assembly 64 continues until the assembly engages the shock absorber units 71 and 72. The retraction of the carriage 25 activates a limit switch to energize the solenoid 78b of the valve 78 for the cylinder 75 and causes the cylinder rod 76 to retract and pull the lever assembly 64 and retainer roller 17 upward to the withdrawn position preparatory to receiving another tire 10 for trimming. At the same time that the solenoid 78b is energized, the pneumatic disc brake 90 is activated to stop the rotation of the retainer roller 17. The disc brake 90 is disengaged when the solenoid 78 is energized during the next cycle.

After retraction of the carriage 25 is completed, the limit switch also energizes the solenoid 42b, shifts the control valve 42 for the fluid cylinder 40 and causes prompt extension of the cylinder rod 41 and carriage 25 back to the position illustrated in FIG. 4. Also, the control for the drive roller motor 50 reduces the motor speed to its lower rpm to begin the next cycle. Once the carriage 25 is again extended, another tire is released and the trimming cycle repeated.

While the invention has been shown and described with reference to a specific embodiment thereof, this is intended for the purpose of illustration rather than limitation and other variations and modifications of the specific apparatus herein shown and described will be apparent to those skilled in the art all within the intended spirit and scope of the invention. Accordingly, the patent is not to be limited to the specific embodiment herein shown and described nor in any other way that is inconsistent with the extent to which the progress in the art has been advanced by the invention.

We claim:

1. In a post-cure tire processing apparatus for sequentially receiving and discharging tires of various dimensions and for spinning a received tire about its axis of rotation to facilitate trimming therefrom vents, mold flash and the like, the improvement which comprises:

at least three parallel rollers adapted to engage at spaced circumferential locations, the tread portion of and rotatably locate therebetween a tire for spinning about its axis of rotation, said rollers including:

a drive roller and variable speed drive means therefore for spinning said tire, a movably mounted retaining roller adapted to apply retaining pressure to said tire, and a retractable roller adapted to be shifted between an operating tire supporting position and a retracted position permitting removal of a tire from between said rollers, adjustable means engageable with opposite sides of a tire retained by said rollers for controlling the axial position of a tire while spinning, and means for sensing and measuring the diameter of a tire to be trimmed and for adjusting the speed of said drive means in accordance with said measurement.

2. Apparatus as defined in claim 1 including a carriage adapted to support said retractable roller and having an inclined floor portion along which a tire rolls to its trimming position, said carriage being movable in a horizontal direction between an extended position wherein said retractable roller is in operating position and a retracted position wherein said floor portion and retractable roller permit said tire to drop from said trimming station.

3. Apparatus as defined in claim 1 wherein said means for sensing and measuring the diameter of a tire to be trimmed comprises a plurality of photo cells with their beams located in the path of travel of a tire to be received at said trimming station and adapted to be interrupted by said tire depending on the diameter of said tire.

4. Apparatus as defined in claim 1 including a lever arm assembly pivotable about a fixed axis and adapted to carry said retaining roller at one end thereof, and means for pivoting said lever arm assembly to swing said retaining roller between a tire engaging operating position and a raised tire receiving position.

5. Apparatus as defined in claim 4 wherein said means for pivoting said lever arm assembly comprises a fluid cylinder.

6. Apparatus as defined in claim 4 including brake means for stopping rotation of said retainer roller after discharge of a tire from said trimming station.

7. Apparatus as defined in claim 1 wherein said adjustable means for controlling the axial position of a tire comprises a pair of parallel rollers generally perpendicular to the axis of said tire and movable toward and away from one another between a widely spaced tire receiving position and an inward tire sidewall engaging position spaced according to the width of said tire.

8. Apparatus as defined in claim 7 wherein said adjustable means further includes a movable carriage for each of said parallel rollers, a ball nut carried by each of said carriages, a ball screw operatively associated with said ball nuts and means for turning said ball screw in either direction for moving said carriages selectively toward and away from one another.

9. Apparatus as defined in claim 8 wherein said means for turning said ball screw comprises a rotary motor at each end thereof and clutch means for each motor, said clutch means being selectively engageable to connect a motor to said ball screw.

* * * * *